US008649341B2

(12) United States Patent
Guey et al.

(10) Patent No.: US 8,649,341 B2
(45) Date of Patent: Feb. 11, 2014

(54) JOINT MANAGEMENT OF RADIO AND TRANSPORT RESOURCES

(75) Inventors: Jiann-Ching Guey, Fremont, CA (US);
Shing-Wa Wong, Saratoga, CA (US);
Jung-Fu Cheng, Fremont, CA (US);
Dennis Hui, Sunnyvale, CA (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 316 days.

(21) Appl. No.: 13/048,226

(22) Filed: Mar. 15, 2011

(65) Prior Publication Data

US 2012/0236774 A1 Sep. 20, 2012

(51) Int. Cl.
*H04L 12/28* (2006.01)

(52) U.S. Cl.
USPC ............ 370/329; 370/330; 370/431; 370/436

(58) Field of Classification Search
None
See application file for complete search history.

(56) References Cited

U.S. PATENT DOCUMENTS

| 7,827,308 | B2 * | 11/2010 | Neustadter et al. | ........... 709/244 |
|---|---|---|---|---|
| 2002/0075906 | A1 * | 6/2002 | Cole et al. | ..................... 370/535 |
| 2004/0264683 | A1 * | 12/2004 | Bye | ............................... 379/402 |
| 2006/0056373 | A1 | 3/2006 | Legg | |
| 2011/0265140 | A1 * | 10/2011 | Rakib | ........................... 725/124 |

FOREIGN PATENT DOCUMENTS

WO    WO 2005/050850 A2    6/2005

* cited by examiner

*Primary Examiner* — John Blanton
*Assistant Examiner* — Jay P Patel (57) ABSTRACT

A system for managing radio access resources includes a joint radio resource management/transport resource management unit configured to communicate with a plurality of radio units over a transport network, to jointly allocate radio resources at the radio unit and transport resources on the transport network in response to requests from wireless terminals requesting access to radio resources from the radio units, to send a radio resource allocation schedule to the plurality of radio units that defines radio resource allocations for the wireless terminals, and to generate a transport resource allocation schedule that defines transport resource allocations for the wireless terminals. The system further includes a transport resource controller configured to receive the transport resource allocation schedule and to map user data to physical transport resources on the transport network in response to the transport resource allocation schedule.

11 Claims, 7 Drawing Sheets

JOINT MANAGEMENT OF RADIO AND TRANSPORT RESOURCES

FIELD

The present invention relates to wireless communication networks, and in particular, the present invention relates to communication networks in which both radio resources and transport resources are utilized.

BACKGROUND

In a typical cellular radio system, wireless terminals (also known as mobile stations and/or user equipment units (UEs)) communicate via a radio access network (RAN) to one or more core networks. User equipment units (UEs) may be, for example, mobile telephones ("cellular" telephones), desktop computers, laptop computers, tablet computers, and/or any other devices with wireless communication capability to communicate voice and/or data with a radio access network.

The radio access network covers a geographical area which is divided into cell areas, with each cell area being served by a base station, e.g., a radio base station (RBS), which in some networks is also called "NodeB" or (in Long Term Evolution) an eNodeB. A cell is a geographical area where radio coverage is provided by the radio base station equipment at a base station site. Each cell is identified by an identity within the local radio area, which is broadcast in the cell. The base stations communicate over the air interface operating on radio frequencies with the UEs within range of the base stations.

In some versions (particularly earlier versions) of the radio access network, several base stations are typically connected (e.g., by landlines or microwave) to a radio network controller (RNC). The radio network controller, also sometimes termed a base station controller (BSC), supervises and coordinates various activities of the plural base stations connected thereto. The radio network controllers are typically connected to one or more core networks, typically through a gateway.

Universal Mobile Telecommunications System (UMTS) is a third generation mobile communication system, which evolved from the Global System for Mobile Communications (GSM), and is intended to provide improved mobile communication services based on Wideband Code Division Multiple Access (WCDMA) access technology. The Universal Terrestrial Radio Access Network (UTRAN) is essentially a radio access network using wideband code division multiple access for user equipment units (UEs). The Third Generation Partnership Project (3 GPP) has undertaken to evolve further the UTRAN and GSM based radio access network technologies.

Specifications for Evolved Universal Terrestrial Radio Access Network (E-UTRAN) are ongoing within the 3rd Generation Partnership Project (3 GPP). Another name used for E-UTRAN is the Long Term Evolution (LTE) Radio Access Network (RAN). Long Term Evolution (LTE) is a variant of a 3GPP radio access technology wherein the radio base station nodes are connected directly to a core network rather than to radio network controller (RNC) nodes. In general, in LTE the functions of a radio network controller node are performed by the radio base stations nodes. As such, the radio access network of an LTE system has an essentially "flat" architecture comprising radio base station nodes without reporting to radio network controller nodes.

The evolved UTRAN comprises evolved base station nodes, e.g., evolved NodeBs or eNBs, providing user-plane and control-plane protocol terminations toward the UEs. The eNB hosts the following functions (among other functions not listed): (1) functions for radio resource management (e.g., radio bearer control, radio admission control), connection mobility control, dynamic resource allocation (scheduling); (2) mobility management entity (MME) including, e.g., distribution of paging message to the eNBs; and (3) User Plane Entity (UPE), including IP Header Compression and encryption of user data streams; termination of U-plane packets for paging reasons, and switching of U-plane for support of UE mobility. The eNB hosts the PHYsical (PHY), Medium Access Control (MAC), Radio Link Control (RLC), and Packet Data Control Protocol (PDCP) layers that include the functionality of user-plane header-compression and encryption. The eNodeB also offers Radio Resource Control (RRC) functionality corresponding to the control plane. The eNodeB performs many functions including radio resource management, admission control, scheduling, enforcement of negotiated UL QoS, cell information broadcast, ciphering/deciphering of user and control plane data, and compression/decompression of DL/UL user plane packet headers.

The LTE standard is based on multi-carrier based radio access schemes such as Orthogonal Frequency-Division Multiplexing (OFDM) in the downlink and SC-FDMA in the uplink. Orthogonal FDM's (OFDM) spread spectrum technique distributes the data over a large number of carriers that are spaced apart at precise frequencies. This spacing provides the "orthogonality" in this technique which reduces interference. The benefits of OFDM are high spectral efficiency, resiliency to RF interference, and lower multi-path distortion.

As noted above, in the E-UTRAN Radio Access Network scheme, the management of radio resource such as time, frequency and spatial resources takes place in the individual base stations (or cells). Each eNodeB base station therefore includes a Radio Resource Management (RRM) unit for performing management of radio resources. These RRM units typically operate independently from each other, except for very limited exchange of information, such as traffic load condition.

Figures 1A, 1B:
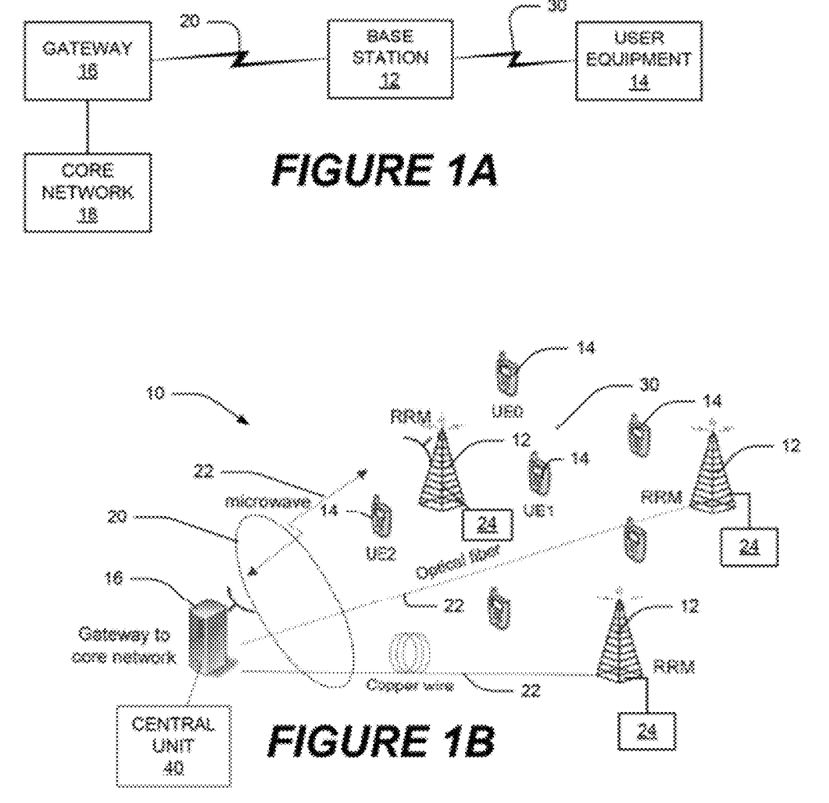
FIGS. 1A and 1B are schematic illustrations of a conventional wireless network.

FIGS. 1A and 1B schematically illustrate a conventional wireless network 10. Referring to FIG. 1A, in a conventional wireless network 10, a base station 12 communicates with a core network 18 through a gateway 16. Communications between the base station 12 and the gateway 16 are carried over a transport network 20, which may include wired and/or wireless communication links. The base station 12 also communicates with one or more user equipment units (UEs) 14 through a radio access network (RAN 30). Signals, such as voice and/or data signals, transmitted by the UE 14 are carried over the RAN 30 to the base station 12, and then over the transport network 20 to the gateway 16, for transmission to the core network 18.

Referring to FIG. 1B, a conventional wireless network 10 may include a plurality of base stations 12 that provide radio communication services for a plurality of user equipment units (UE) 14 within their respective geographic service areas (cells). Each base station 12 includes an associated RRM unit 24, and each of the base stations 12 communicates with the core network through a gateway 16 via a transport network 20. At the base stations 12, data received from and to be transmitted to the User Equipment units (UE) 14 is transported to and from the core network through a transport network 20 that may include a variety of transport links 22, such as optical fiber, microwave and/or copper wires.

Conventionally, these various transport links 22 are point to point connections, as shown in FIG. 1B. Each base station 12 generates or consumes a certain amount of data that may vary as traffic condition changes over time. Thus, the point to point links 22 are designed to accommodate the peak data rates a base station generates or consumes.

The output of the RRM unit 24 in a conventional radio access network is a schedule, which typically defines an allocation of time, frequency and/or spatial resources to the UEs 14 in the system, and the Modulation and Coding Scheme (MCS) the given resource can support.

Figure 2:
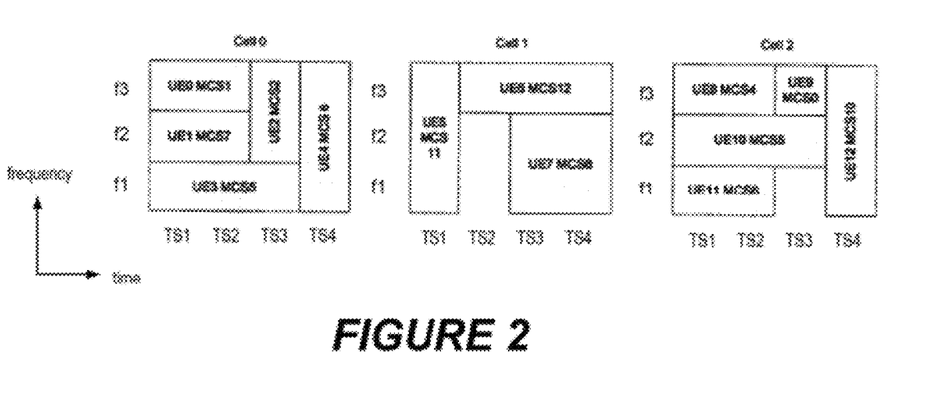
FIG. 2 illustrates resource allocation schedules for various network cells.

FIG. 2 illustrates hypothetical resource allocation schedules for three different cells, Cell 0, Cell 1 and Cell 2. For clarity of illustration, the spatial dimension is omitted from the schedules shown in FIG. 2. However, it will be appreciated that the spatial dimension could include, for example, a particular sector of a cell in which resources are allocated to a UE 14.

In the example shown in FIG. 2, three frequencies (f1 to f3) and four time slots (TS1 to TS4) are available for allocation to various UEs. For example, in Cell 0, UE0 is allocated frequency f3 for two time slots, TS1 and TS2, and is instructed to use modulation and coding scheme MCS1 within those resources. UE1 is allocated frequency f2 for two time slots, TS1 and TS2, and is instructed to use modulation and coding scheme MCS7 within those resources. UE2 is allocated frequencies f2 and f3 for one time slot, TS3, and is instructed to use modulation and coding scheme MCS2 within those resources, etc.

There is one such resource allocation schedule for the uplink (i.e., for communications from the UE 14 to the base station 12) and another for downlink (i.e., for communications from the base station 12 to the UE 14), since the transport resource for the two link directions is statically allocated in the conventional network.

As long as the transport network links 22 are dimensioned to carry the peak traffic that the base stations 12 in the RAN may generate, the transport and radio access networks operate independently. The designs of the two networks are also disjoint.

In practice, the traffic generated or consumed by base stations 12 may vary over time and locations as users move. Therefore, not all base stations 12 may be operating at a peak rate at a given point in time. The statically dimensioned transport network 20 is not very efficient, as there may be excess capacity that may not be fully utilized at any given time.

SUMMARY

A system for managing radio access resources according to some embodiments includes a joint radio resource management/transport resource management unit configured to communicate with a plurality of radio units over a transport network, to jointly allocate radio resources at the radio unit and transport resources on the transport network in response to requests from wireless terminals requesting access to radio resources from the radio units, to send a radio resource allocation schedule to the plurality of radio units that defines radio resource allocations for the wireless terminals, and to generate a transport resource allocation schedule that defines transport resource allocations for the wireless terminals. The system further includes a transport resource controller configured to receive the transport resource allocation schedule and to map user data to physical transport resources on the transport network in response to the transport resource allocation schedule.

The system may further include a user/control data unit configured to communicate user and control data to the plurality of radio units over the transport network.

The transport resource controller may be configured to map the user data to the physical transport resources using a dynamic time division multiplexing transport scheme.

The transport network may include an optical network, and the transport resource controller may be configured to map the user data to the physical transport resources using a dynamic wavelength division multiplexing/time division multiplexing transport scheme.

The joint radio resource management/transport resource management unit may be configured to allocate radio resources at the radio unit and transport resources on the transport network by generating a joint radio/transport resource schedule.

The joint radio/transport resource schedule may define a transport resource allocation and a radio resource allocation for at least one wireless terminal.

The transport resource may include a transport time T and a wavelength I. The radio resource may include a frequency f, an antenna a and a modulation and coding scheme MCS. The radio resource may include a frequency, a time slot and/or a spreading code. In some embodiments, the transport resource may include a time slot and/or a wavelength.

The joint radio resource management/transport resource management unit may be configured to receive a request for access from a wireless terminal, to determine availability of a radio resource and a transport resource in response to the request for access, and to schedule the radio resource and the transport resource in response to availability of the radio resource and the transport resource.

The joint radio resource management/transport resource management unit may be further configured to prioritize the request for access.

The radio resource may include a first radio resource, and the joint radio resource management/transport resource management unit may be further configured to check for availability of a second radio resource in a neighboring cell in response to unavailability of the radio resource in a first cell, and to allocate the second resource in response to availability of the second resource.

The second radio resource may have a different modulation and coding scheme than the first radio resource.

The transport resource may include a first transport resource, and the joint radio resource management/transport resource management unit may be further configured to determine if a second transport resource is available in response to unavailability of the transport resource, and to allocate the second transport resource in response to availability of the second transport resource.

The joint radio resource management/transport resource management unit may be configured to queue the request for access in response to unavailability of the second transport resource.

The transport resource controller may be configured to multicast a transport resource schedule to the plurality of radio units.

Some embodiments provide methods of managing radio resources in a system including a resource management unit that communicates with a plurality of radio units over a transport network. The methods include receiving at the resource management unit a request from a wireless terminal for access to a radio resource at one of the plurality of radio units, determining availability of the radio resource and availability of a transport resource on the transport network in response to the request for access, and scheduling the radio resource and the transport resource in response to availability of the radio resource and the transport resource.

The methods may further include prioritizing the request for access.

The methods may further include checking for availability of a second radio resource in a neighboring cell in response to unavailability of the radio resource in a first cell, and allocating the second resource in response to availability of the second resource.

The methods may further include determining if a second transport resource is available in response to unavailability of the transport resource, and allocating the second transport resource in response to availability of the second transport resource.

BRIEF DESCRIPTION OF THE DRAWINGS

The accompanying drawings, which are included to provide a further understanding of the invention and are incorporated in and constitute a part of this application, illustrate certain embodiment(s) of the invention. In the drawings.

DETAILED DESCRIPTION OF EMBODIMENTS

As noted above in reference to FIG. 1B, a statically dimensioned transport network 20 may not be very efficient, as there may be excess capacity in the transport network that may not be fully utilized at any given time. This may not be a serious problem if the radio network traffic volume is moderate and the transport network has enough capacity to support it. However, recent radio access network architecture is trending toward the consolidation of some signal processing functionalities in a Central Unit (CU) 40 that is detached from the radio transceiver at the cell site. The central unit 40 may be implemented, for example, at the gateway or elsewhere within the core network 18. This may lead to a dramatic increase in traffic carried by the transport network 20, which will need to carry the (digitized) radio I-Q samples from the base stations 12 the central location where signal processing takes place. The capacity requirement may be up to two orders of magnitude greater than a conventional network that only transports binary user data. The latency requirement is also much more stringent in such an arrangement.

Scaling the statically dimensioned conventional point to point transport network therefore becomes much more difficult and may be grossly inefficient.

Because of the flat nature of the E-UTRAN system, a central unit 40 may be connected to thousands of remote units. The sheer numbers of physical links and transceiver units that need to be installed may be prohibitively high.

Moreover, along with the relocation of signal processing functionalities, the RRM functionalities from multiple cell sites may be consolidated at the central unit as well. This opens up the potential of performing joint radio resource management (joint RRM) across multiple sites that can more efficiently utilize the available radio resource by employing advanced algorithms, such as Inter-Cell Interference Coordination (ICIC), fast cell reselection and/or load balancing. All these features may benefit from dynamic transport resource management.

Accordingly, systems/methods according to some embodiments provide a network architecture that may include shared transport resources instead of dedicated point-to-point links. Moreover, the transport resources (i.e. the communication resources between the base stations and the central unit) and radio resources (i.e. the communication resources between the base stations and the UEs) may be combined to form a set of joint resources, and methods of joint resource allocation are provided according to some embodiments that may enhance the operation of the network.

Embodiments of the present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

Some embodiments are described herein using optical fiber as an exemplary transport medium, and several embodiments of such a network with specific hardware components facilitating the flexible allocation of optical fiber based transport resources are described herein. However, it will be appreciated that embodiments of the invention can be implemented using other types of transport communication technologies, such as microwave links, copper links, etc.

Figure 3:
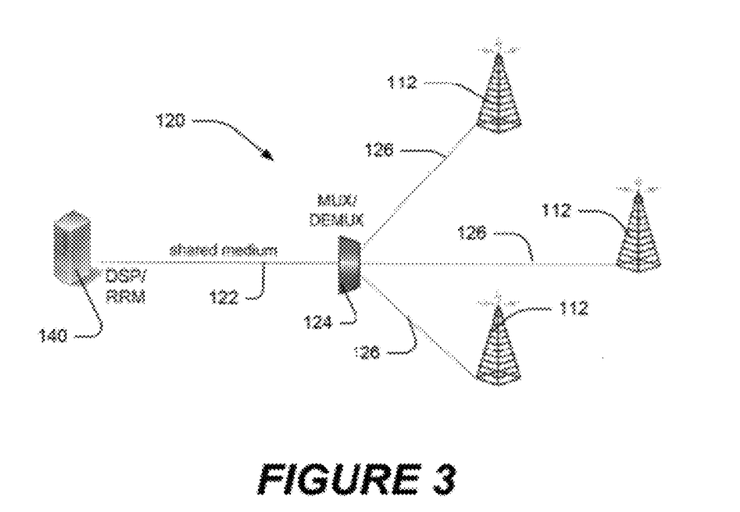
FIG. 3 illustrates a point-to-multipoint communication system.

According to some embodiments, a transport network 120 includes a point-to-multipoint communication system including a shared medium 122, which may include an optical fiber, a microwave link, a satellite link, or any other communication medium, that is connected between a central unit 140 and a multiplexer/demultiplexer (MUX/DEMUX) 124. A plurality of individual communication links are provided between the MUX/DEMUX 124 and a plurality of base stations, or radio units 112. Accordingly, communication signals between the central unit 140 and the radio units 112 may be carried at least partly on a shared medium 122 in the transport network 120. The central unit 140 may perform functions, such as digital signal processing and/or radio resource management.

Figure 4:
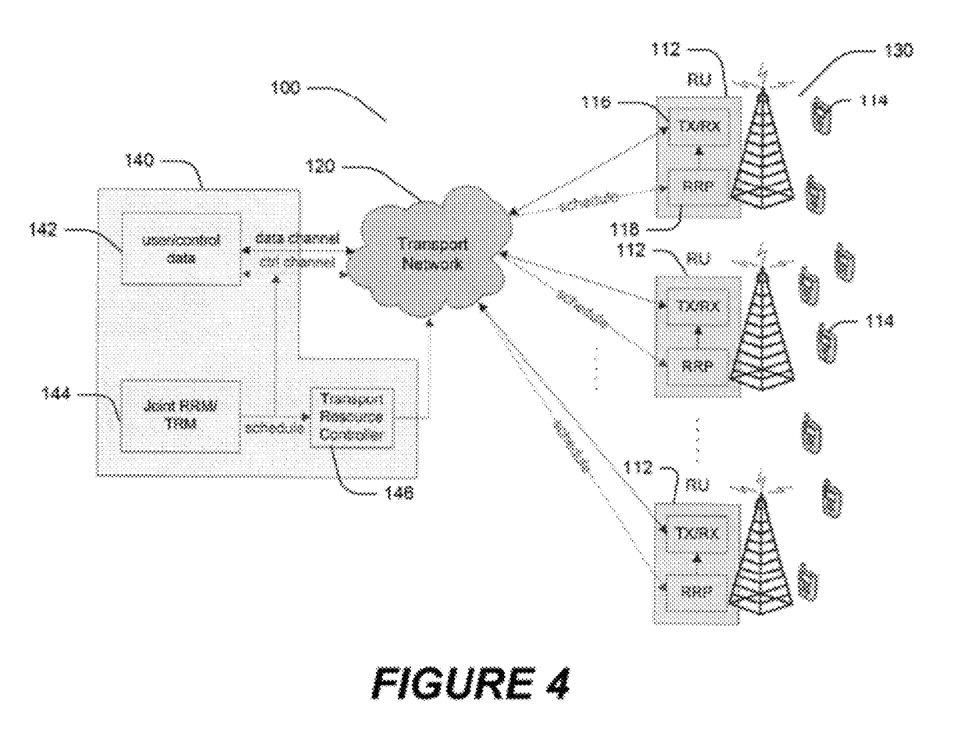
FIG. 4 illustrates a communication system in accordance with some embodiments.

FIG. 4 is a block diagram of a communication system 100 in accordance with some embodiments. In the communication system 100, a plurality of radio units 112 communicate with a central unit 140 via a transport network 120. One or more of the radio units 112 may also provide a radio access network for a plurality of user equipment units (UEs) 114.

Each of the radio units 112 includes a transceiver (TX/RX) 116 and a radio resource processing unit (RRP) 118.

The central unit 140 includes a user/control data processing unit 142, a joint radio resource management/transport resource management (RRM/TRM) unit 144, and a transport resource controller 146. Control data and user data from the UEs 114 and/or radio units 112 is carried through the transport network 120 to the central unit 140 and is processed by the user/control data processing unit 142.

As noted above, the transport network 120 may include one or more shared transport media, such as the shared medium 122 shown in FIG. 3. One or more shared transport resources, such as time slots, spreading codes, frequencies and/or wavelengths, may be associated with the shared medium 122. According to some embodiments, these shared transport resources may be allocated in conjunction with radio access network resources to increase efficiency of the overall network operation.

The joint RRM/TRM unit 144, which may reside in the CU 140, is responsible for allocating the joint radio/transport resources to the UEs 114 that request services from the radio units 112. According to some embodiments, the joint RRM/TRM unit 144 generates a joint resource management schedule that jointly allocates resources on the transport network 120 and the radio access network 130.

The Transport Resource Controller (TRC) 146 receives resource scheduling information from the joint RRM/TRM unit 144 and maps data to the physical transport resources of the transport network 120 according to the resource scheduling information. The portion of the joint resource management schedule that relates to the radio access network resources is transmitted through the transport network 120 to the Radio Resource Processing unit (RRP) 118 in each radio unit 112. The RRP 118 then maps data to the physical transceiver unit 116 according to the resource scheduling information.

Figure 5:
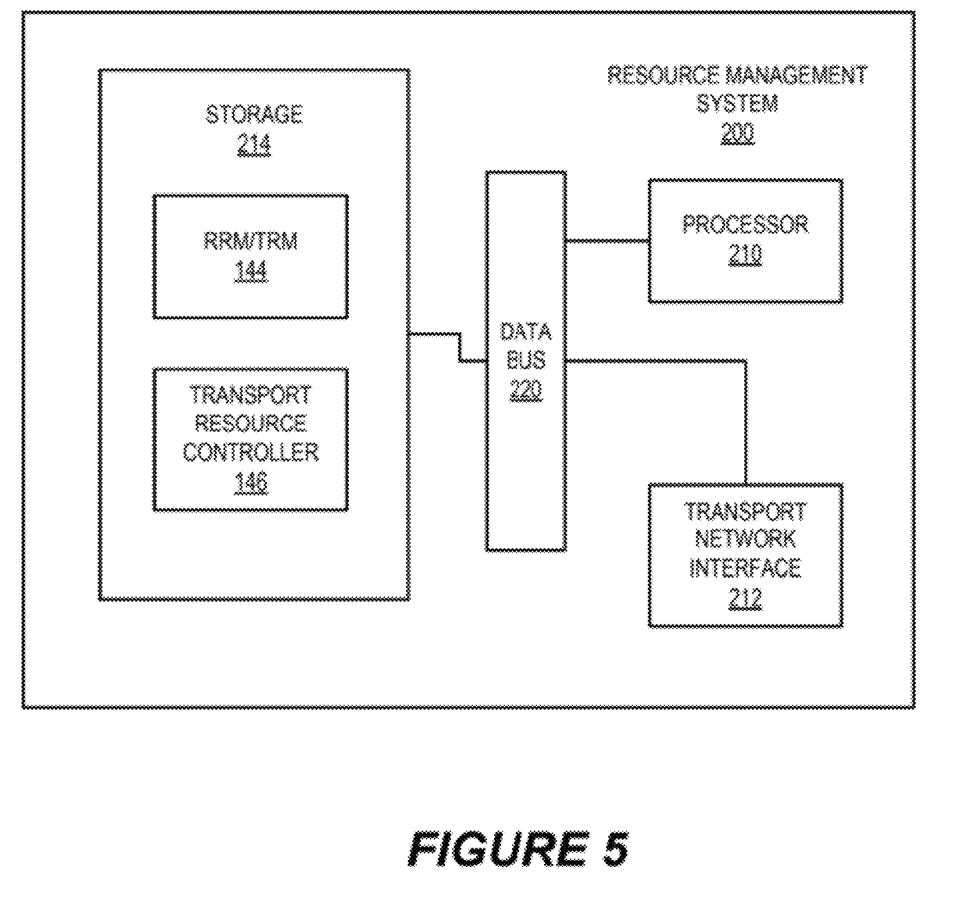
FIG. 5 illustrates a resource management system in accordance with some embodiments.

FIG. 5 is a block diagram of a resource management system 200 in accordance with some embodiments. The resource management system 200 may be implemented in a central unit 140, may be co-located with a central unit 140, or elsewhere within the core network. In some embodiments, the resource management system 200 may be implemented in a radio unit 112 and/or may be co-located with a radio unit 112.

A resource management system 200 may include a processor 210 that controls operations of the resource management system 200 and a transport network interface 212 that is coupled to the processor 210 through a data bus 220 and that provides a communication interface with the transport network 120. A storage unit 214, such as an addressable memory, is also coupled to the processor 210 through the data bus 220. One or more executable modules and/or data stores may reside in the storage 214, where they can be accessed by the processor. In particular, the storage 214 may include a joint RRM/TRM module 216 and a transport resource controller module 218.

Specific embodiments of the invention will now be described with regard to a communication system that uses a passive optical fiber link as a shared resource in the transport network. However, will be appreciated that the invention is not limited to passive optical transport networks, but could be implemented using any kind of communication network that employs a shareable wired and/or wireless communication link, such as a microwave link, a satellite link, a coaxial cable link, a wireless local loop (WLL), etc.

In a Passive Optical Network (PON), digital information is carried over fiber optic cables. The digital information may be carried as a baseband signal over one or more designated wavelengths. A passive optical network may contain only passive optical components, such as passive splitters and Arrayed Waveguide Gratings (AWG). Since no active switching is involved, the dynamic allocation of the transport resources may be very responsive and may introduce little latency in the transport network.

Figure 6:
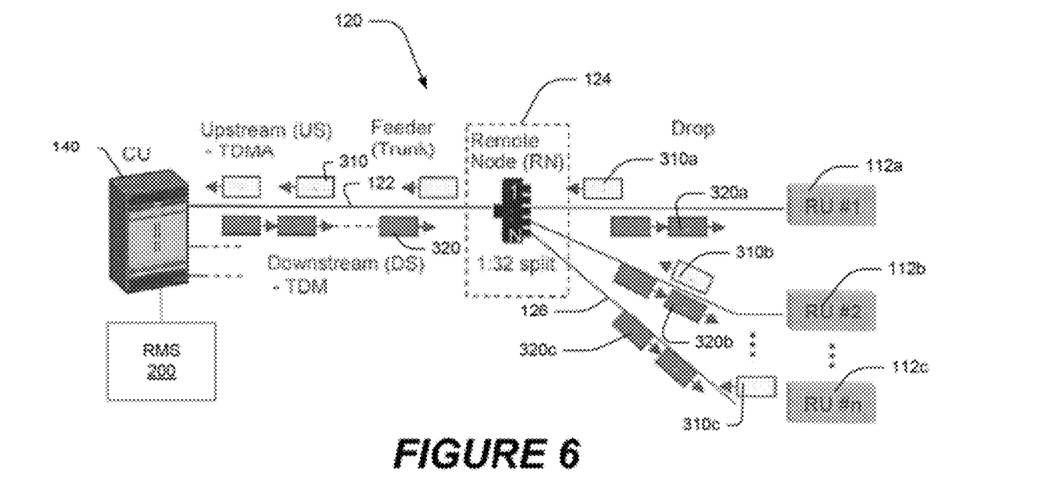
FIG. 6 illustrates a point-to-multipoint communication system employing time division multiplexing according to some embodiments.

Referring to FIG. 6, the communication system 100 may include a central unit 140. A resource management system 200 may be implemented in or with the central unit 140 or otherwise within a core network accessible to the central unit 140. An optical feeder (trunk) line 122 is coupled between the central unit 140 and a remote node 124, which acts as an optical splitter/combiner. In some embodiments, the remote node 124 may include a 1:32 optical splitter/combiner. A plurality of individual optical links 126 are connected between the remote node 124 and respective radio units 112a-c. Downstream packets 320 are transmitted by the central unit 140 to the radio units 112a-c using a common wavelength. Each radio unit 112a-c may be assigned a unique time slot within which to transmit/receive packets from the central unit 140, i.e. using time division multiple access (TDMA). That is, packets 320 destined for different radio units 112a-c are transmitted using the same optical wavelength but in different time slots. The packets are split at the remote unit 124 and transmitted along appropriate optical links to the destination remote unit 112a-c.

Similarly, upstream packets 310a-c transmitted from the remote units 112a-c to the central unit 140 are transmitted along the optical links 126 to the remote node 124 using the same optical wavelength but during different time slots. The upstream packets 310a-c are passively combined at the remote node 124 and are transmitted along the shared feeder line 122 to the central unit 140.

The particular time slot in which a radio unit 112a-c is allocated for sending and/or receiving packets is determined by the resource schedule generated by the joint RRM/TRM unit 144 in the resource management system 200.

Such an arrangement may be referred to as dynamic time division multiplexing (dynamic TDM). In the embodiments illustrated in FIG. 6, the transport network 120 may employ a point to multipoint Time Division Multiplexing (TDM) Passive Optical Network (PON) system. The splitter at the remote node 124 replicates the input signal at the output for downstream transmission to the radio units 112*a-c*, and combines multiple inputs from the radio units 112*a-c* for output on the upstream to the central unit 140

Therefore, the downstream traffic is broadcast in nature, which is a desirable feature in a system employing joint processing in which multiple radio units 112*a-c* may participate in coordination to transmit signals to the same UE 114, such as during a handover. On the upstream, each radio unit 112*a-c* is allocated one or more time slots for transmission/reception of packets. The allocation of time slots to a radio unit 112*a-c* can be varied dynamically by the transport resource controller 146 in response to changing traffic conditions. For example, a radio unit 112*a-c* that is serving a greater number of UEs 114 and/or UEs that demand a greater bandwidth, may be allocated more time slots on the transport network in which to send/receive packets to/from the central unit.

Figure 7:
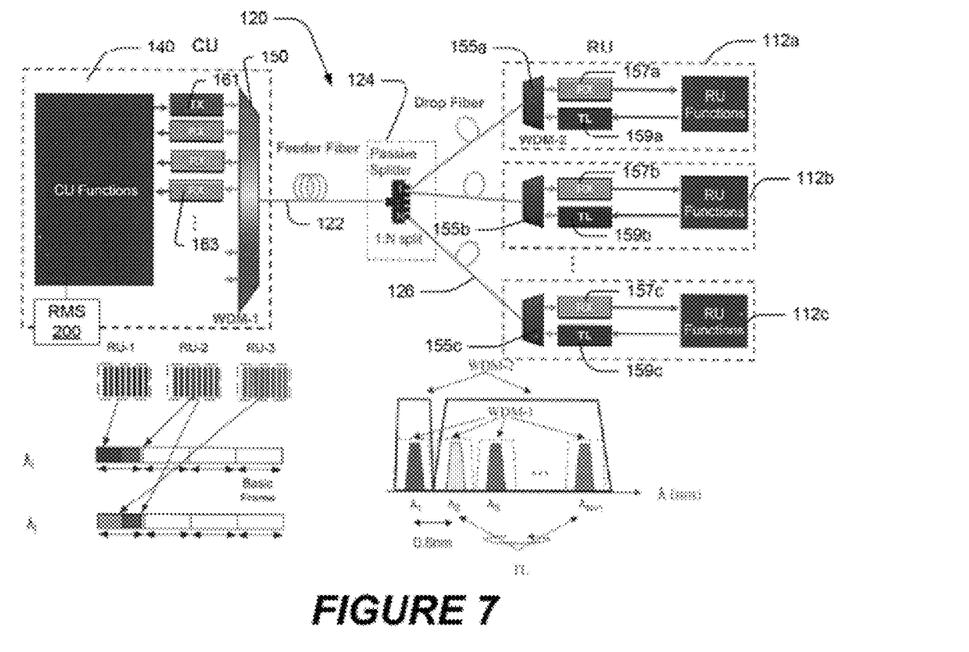
FIG. 7 illustrates a point-to-multipoint communication system employing dynamic wavelength division multiplexing/time division multiplexing according to some embodiments.

Embodiments that are configured to perform dynamic wavelength division multiplexing/time division multiplexing (WDM/TDM) are illustrated in FIG. 7. In the embodiments shown in FIG. 7, the transport network 120 may employ the a similar TDM configuration in the downstream path as the embodiments shown in FIG. 6. However, tunable lasers (TL) 159*a-c* in respective ones of the radio units 112*a-c* maybe used as colorless transmitters on the upstream (from the radio units 112*a-c* to the central unit 140).

A tunable laser may not be assigned to a fixed wavelength. Instead, the wavelength of a tunable laser may be adjusted to different parts of the spectrum to simultaneously multiplex multiple signals onto the feeder fiber 122, as shown in FIG. 7.

As shown in FIG. 7, to support dynamic WDM/TDM, the central unit 140 may include a wavelength division multiplexer 150, an optical transmitter 161, and a plurality of optical receivers 163. Each radio unit 112*a-c* may include a wavelength division multiplexer 155*a-c*, an optical receiver 157*a-c* and a tunable laser 159*a-c*.

The dynamic WDM/TDM embodiments illustrated in FIG. 7 may utilize a fast tunable laser to allow each radio unit interface to dynamically change wavelengths, so that the wavelength used by a particular radio unit 112*a-c* can be changed over time. However, each radio unit 112*a-c* can transmit upstream signals using its assigned wavelength at the same time.

Thus, for example, a particular radio unit 112*a-c* may be assigned a particular wavelength and time slot in which to transmit upstream signals using a time division multiple access (TDMA) approach.

By tuning the tunable laser, the transport resource controller 146 (FIG. 4) can dynamically allocate wavelengths to the radio units 112*a-c* very quickly, e.g. within tens of nanoseconds. Moreover, the same wavelength may be shared by different radio units using TDMA. This flexibility allows fewer total wavelengths to be required in the system than would be required in a fixed wavelength allocation architecture as long as the total capacity of the transport resources exceeds the peak capacity demand from all radio units.

Figure 8:
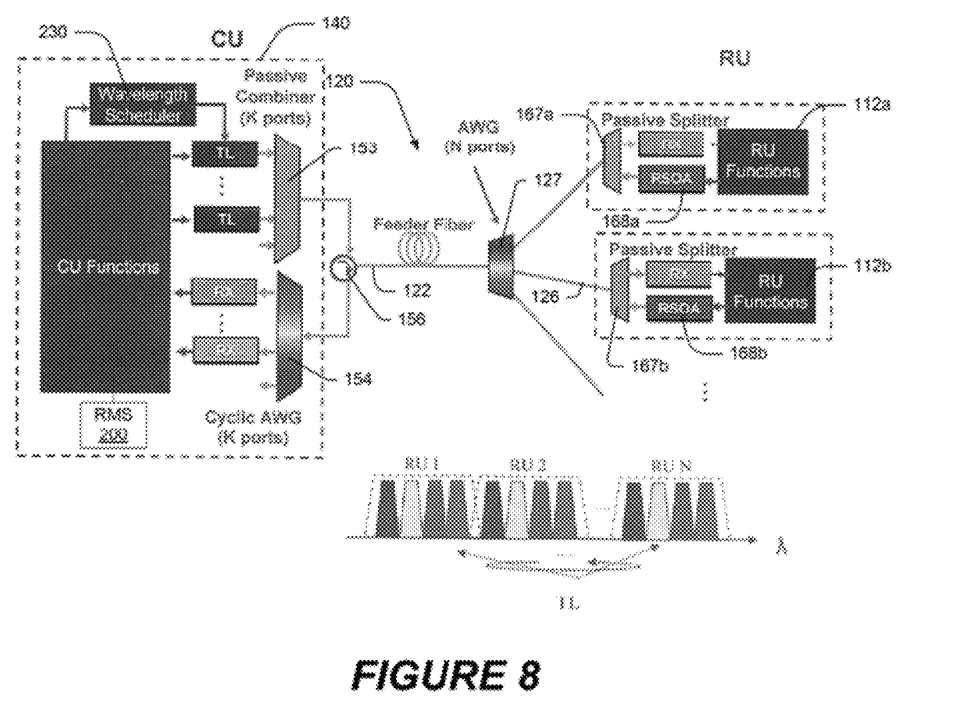
FIG. 8 illustrates a point-to-multipoint communication system employing dynamic wavelength division multiplexing/time division multiplexing according to further embodiments.

FIG. 8 shows yet further embodiments that are configured to perform transport resource sharing using dynamic WDM/TDM. As shown therein, an Arrayed Waveguide Grating (AWG) device 127 is used in place of the passive splitter at the remote node. The AWG 127 is a wavelength demultiplexer in one direction and a multiplexer in the reverse direction.

As shown in FIG. 8, the central unit 140 includes a passive combiner 153 that is coupled to a plurality of tunable lasers IL and a cyclic AWG 154 that is coupled to a plurality of receiver units RX. The passive combiner 153 and the cyclic AWG 154 are coupled through a duplexer 156 to a feeder fiber 122, which is coupled in turn to the AWG 127 at the remote node.

Each of the radio units 112*a-b* includes a passive splitter 167*a-b* that is coupled to the AWG 127 and to a receiver unit RX and a Reflective Semiconductor Optical Amplifier (RSOA) 168*a-b* in the radio unit 112*a-b*.

Together with the cyclic AWG 154 inside the CU and the Reflective Semiconductor Optical Amplifier (RSOA) 168*a-b* inside the radio units RU 112*a-b*, the combination can connect any tunable laser TL or receiver RX in the central unit 140 to any radio unit 112*a-b* in either stream direction. In particular, the arrangement illustrated in FIG. 8 allows the central unit 140 to tune the wavelength on one of its tunable lasers in response to a command from the wavelength scheduler 230 to (a) communicate with one of the radio units 112*a-b* in the downstream direction; and/or (b) seed the radio unit's upstream wavelength to communicate with one of the optical receivers in the central unit 140. In other words, the embodiments illustrated in FIG. 8 can pair any radio unit 112*a-b* to a receiver in the central unit 140 by tuning the wavelength used by the radio unit 112*a-b*.

Accordingly, the output of the joint radio/transport resource management unit 144 may specify both radio and transport resources that are allocated to a particular user equipment unit. The allocated resources may include, but are not limited to, destination cell ID, transport time, wavelength and/or link direction. For example, a user equipment unit may be allocated resources as follows: Transport Resources: [transport time T, wavelength A]; Radio Resources: [cell 0, radio time t, frequency f, antenna beam a, MCS 11].

Figure 9:
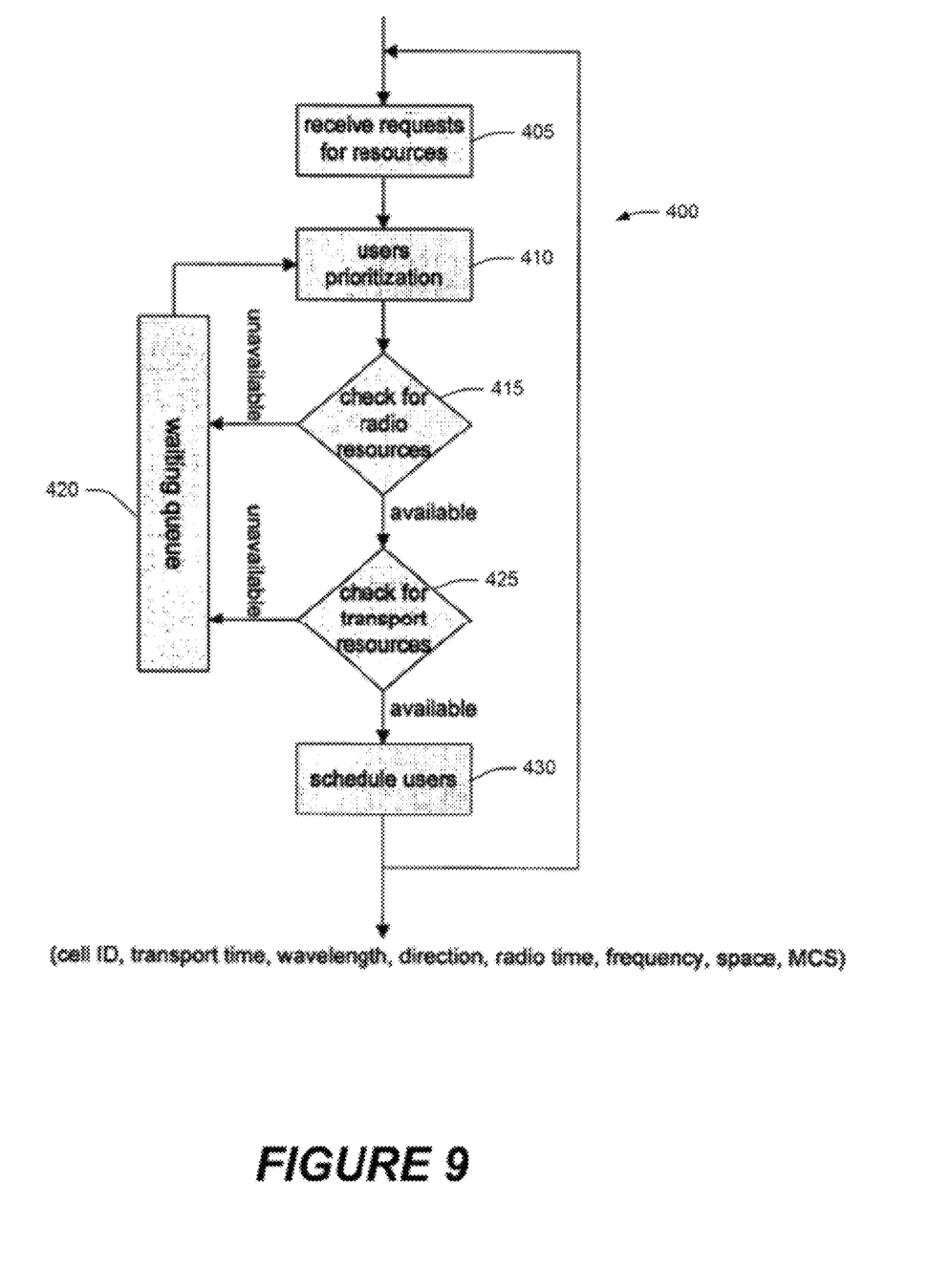
FIG. 9 is a flowchart that illustrates operations for joint radio resource management/transport resource management according to some embodiments.

Joint resource management systems/methods are illustrated in FIG. 9. As shown therein, upon the receipt of one or more requests for resources at the resource management system 200 (block 405), the joint RRM/TRM unit 144 may arrange the requests in order according to a predefined priority measure (block 410). For example, priority may be based on type of user, order of request, amount of resources requested, whether or not the request had been previously queued, etc. The joint RRM/TRM unit 144 then checks for the availability of radio resources for these requests (block 415). Requests that cannot be accommodated due to unavailability of radio resources are placed in a queue to be processed later together with new requests (block 420). If radio resources are available, operations proceed to block 425, where the joint RRM/TRM unit 144 checks for the availability of transport resources (block 425). Requests for which sufficient transport resources are unavailable are placed in the queue for later processing (block 420). Finally, requests with sufficient radio and transport resources are scheduled (block 430). The joint RRM/TRM unit 144 generates a resource scheduling report and sends it to the transport resource controller 146 and/or to the radio units 112, as described above.

The operations illustrated in FIG. 9 divide the resource allocation process sequentially into allocation of radio resources and allocation of transport resources. In embodiments illustrated in FIG. 10, the joint RRM/TRM unit 144 may iterate over intermediate decisions until a refined final result is obtained. For example, referring to FIG. 10, after receipt of one or more requests for resources, the joint RRM/TRM unit 144 may check first for availability of radio resources (block 505). If the radio resources at the radio unit 112 that is most suited to serve the requesting UE 114 are not available, the joint RRM/TRM unit 144 may check to see if the radio unit 112 next best neighboring cell has available resources (block 515). If so, the radio resources are temporarily allocated (block 510) while the availability of the transport resources is checked (block 520). However, if no resources are available in the neighboring cell, the request may be queued. In some embodiments, more than one neighboring cell may be interrogated in this manner until all cells that could possibly fill the request have been checked for availability.

Figure 10:
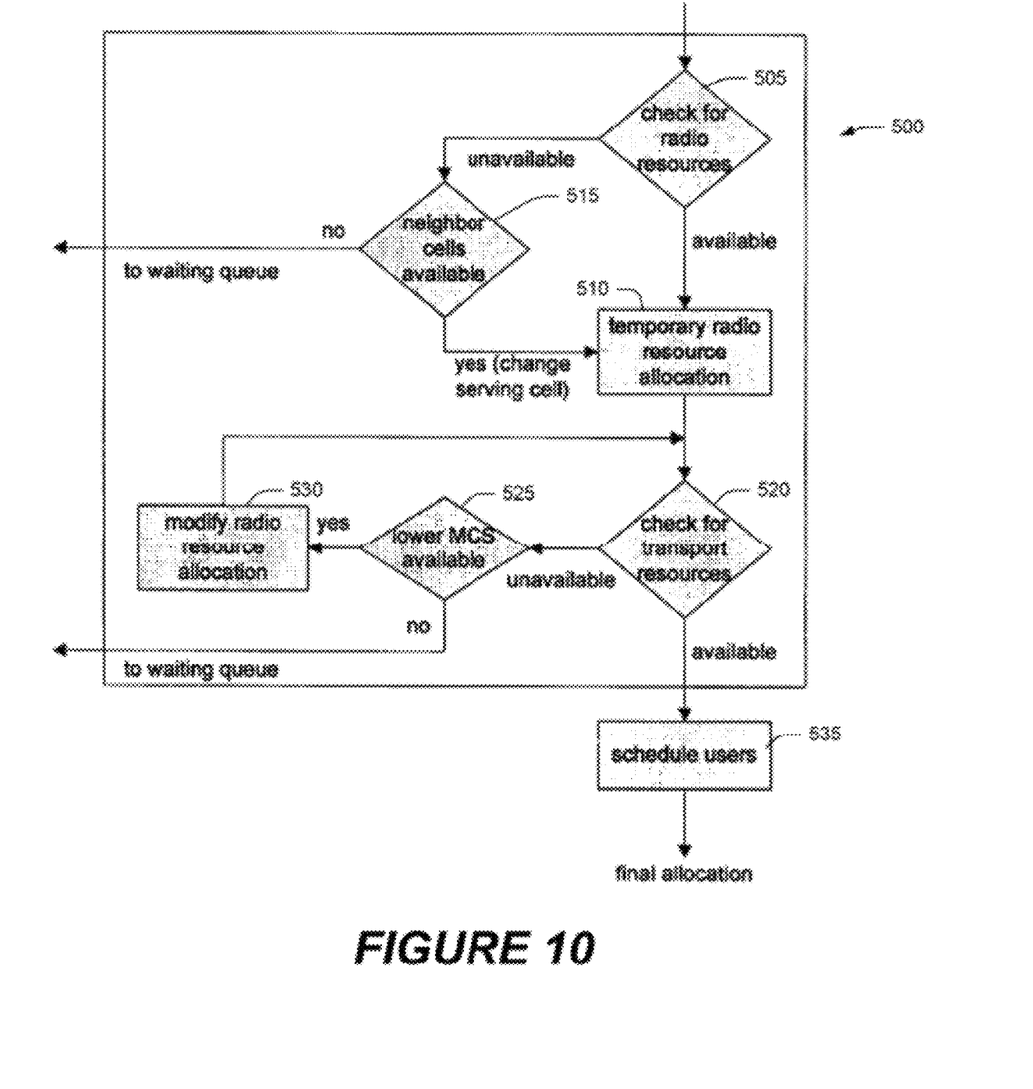
FIG. 10 is a flowchart that illustrates operations for joint radio resource management/transport resource management according to further embodiments.

If the necessary transport resources are available, the request is scheduled (block 535). Otherwise, the joint RRM/TRM unit 144 may check to see if a modulation and coding scheme that consumes fewer transport resources and/or radio resources is available and acceptable to the request (block 525). If so, the radio resource allocation is modified and the transport resources are allocated accordingly (block 530). If an alternate MCS is not available to fill the request, the request is queued.

The operations illustrated in FIG. 10 may help to more fully utilize available transport resources, i.e., they may avoid wasting transport resources that would have otherwise remained unused.

Faster cell re-selection may be facilitated by embodiments of the invention, because of the low level interconnection of the hardware elements of the system. That is, the joint RRM/TRM unit 144 can quickly change the serving radio unit of a user equipment unit in case radio resources are not available immediately at the radio unit that has the best radio coverage of the user equipment unit. This fast cell re-selection may also be desirable in case of interference coordination when the most favorable serving cell for a user equipment unit may vary rapidly as the UEs scheduled in neighboring cells change over time.

Some embodiments may also facilitate Coordinated Multi-Point (CoMP) Transmission/Reception. In CoMP, a user equipment unit may receive its signals from multiple radio units. With joint radio and transport resource management, the data common to these radio units may be broadcast easily, particularly in embodiments that employ a passive splitter at the remote node. For embodiments that use a dedicated wavelength for each radio unit, joint radio and transport resource management systems/methods described herein can direct common data to the set of radio units involved in the coordination.

Some embodiments may furthermore facilitate handling of requests from peak rate users. In IMT-advanced, the peak spectral efficiency for the downlink is 15 bits/sec/Hz/cell. This most likely can only be achieved by employing a Multiple Input Multiple Output (MIMO) transmission technique with higher order modulation. User equipment units with such capability are not expected to be wide spread and the occurrence of such high peak rate demand may be rare and sporadic. With joint radio and transport resource management, transport resources (such as wavelength stacking) can be more easily provisioned to serve these occasional users.

Moreover, embodiments of the invention can enable a wireless telecommunication system to make more efficient use of both radio and transport resources, as transport resources can be allocated based on expected usage of associated radio resources. Thus, fewer requests may be denied on the basis of inadequate radio and/or transport resources, and fewer transport resources may go unused.

Some embodiments of the invention may therefore increase utilization of limited available resources, including radio resources, such as time slots, frequencies, space, spreading codes, orthogonal subcarriers, etc., and transport resources, such as timeslots, wavelengths, links, etc.

Moreover, shared resources may be dimensioned to meet an aggregated traffic load in the system, instead of dimensioning resources to meet the needs of individual base stations, thereby achieving a statistical multiplexing gain. Such improvements may reduce the cost of network deployment, hardware components, and/or overall cost per bits/sec/Hz/cell.

According to some embodiments, radio and transport resources are reserved at the same time, which may guarantee the availability of service if a resource request is granted. There may be no need for the transport network to poll the radio network for bandwidth requirements.

Dynamic joint resource allocation in accordance with some embodiments may allow for fast cell re-selection while accommodating "bursty" peak rate usage and assisting with load balancing in the network.

As will be appreciated by one of skill in the art, the present invention may be embodied as a method, data processing system, and/or computer program product. Accordingly, the present invention may take the form of an entirely hardware embodiment, an entirely software embodiment or an embodiment combining software and hardware aspects all generally referred to herein as a "circuit" or "module." Furthermore, the present invention may take the form of a computer program product on a tangible computer usable storage medium having computer program code embodied in the medium that can be executed by a computer. Any suitable tangible computer readable medium may be utilized including hard disks, CD ROMs, optical storage devices, or magnetic storage devices.

Some embodiments of the present invention are described herein with reference to flowchart illustrations and/or block diagrams of methods, systems and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the present invention may be written in an object oriented programming language such as Java® or C++. However, the computer program code for carrying out operations of the present invention may also be written in conventional procedural programming languages, such as the "C" programming language. The program code may execute entirely on the user's computer, partly on the user's computer, as a stand alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

What is claimed is:

1. A system for managing radio access resources, comprising:
    a joint radio resource management/transport resource management unit configured to communicate with a plurality of radio units over a transport network, to jointly allocate radio resources at the radio unit and transport resources on the transport network in response to requests from wireless terminals requesting access to radio resources from the radio units, to send a radio resource allocation schedule to the plurality of radio units that defines radio resource allocations for the wireless terminals, and to generate a transport resource allocation schedule that defines transport resource allocations for the wireless terminals; and
    a transport resource controller configured to receive the transport resource allocation schedule and to map user data to physical transport resources on the transport network in response to the transport resource allocation schedule, wherein the transport network comprises an optical network, and wherein the transport resource controller is configured to map the user data to the physical transport resources using a dynamic wavelength division multiplexing/time division multiplexing transport scheme.

2. A system for managing radio access resources, comprising:
    a joint radio resource management/transport resource management unit configured to communicate with a plurality of radio units over a transport network, to jointly allocate radio resources at the radio unit and transport resources on the transport network in response to requests from wireless terminals requesting access to radio resources from the radio units, to send a radio resource allocation schedule to the plurality of radio units that defines radio resource allocations for the wireless terminals, and to generate a transport resource allocation schedule that defines transport resource allocations for the wireless terminals; and
    a transport resource controller configured to receive the transport resource allocation schedule and to map user data to physical transport resources on the transport network in response to the transport resource allocation schedule, wherein the joint radio resource management/transport resource management unit is configured to allocate radio resources at the radio unit and transport resources on the transport network by generating a joint radio/transport resource schedule.

3. The system of claim 2, wherein the joint radio/transport resource schedule defines a transport resource allocation and a radio resource allocation for at least one wireless terminal.

4. The system of claim 3, wherein the transport resource comprises a transport time T and a wavelength I.

5. The system of claim 3, wherein the radio resource comprises a frequency f, an antenna a and a modulation and coding scheme MCS.

6. A system for managing radio access resources, comprising:
    a joint radio resource management/transport resource management unit configured to communicate with a plurality of radio units over a transport network, to jointly allocate radio resources at the radio unit and transport resources on the transport network in response to requests from wireless terminals requesting access to radio resources from the radio units, to send a radio resource allocation schedule to the plurality of radio units that defines radio resource allocations for the wireless terminals, and to generate a transport resource allocation schedule that defines transport resource allocations for the wireless terminals; and
    a transport resource controller configured to receive the transport resource allocation schedule and to map user data to physical transport resources on the transport network in response to the transport resource allocation schedule, wherein the joint radio resource management/transport resource management unit is configured to receive a request for access from a wireless terminal, to determine availability of a radio resource and a transport resource in response to the request for access, and to schedule the radio resource and the transport resource in response to availability of the radio resource and the transport resource.

7. The system of claim 6, wherein the joint radio resource management/transport resource management unit is further configured to prioritize the request for access.

8. The system of claim 6, wherein the radio resource comprises a first radio resource, and wherein the joint radio resource management/transport resource management unit is further configured to check for availability of a second radio resource in a neighboring cell in response to unavailability of the radio resource in a first cell, and to allocate the second resource in response to availability of the second resource.

9. The system of claim 8, wherein the second radio resource has a different modulation and coding scheme than the first radio resource.

10. The system of claim 6, wherein the transport resource comprises a first transport resource, and wherein the joint radio resource management/transport resource management unit is further configured to determine if a second transport resource is available in response to unavailability of the transport resource, and to allocate the second transport resource in response to availability of the second transport resource.

11. The system of claim 10, wherein the joint radio resource management/transport resource management unit is configured to queue the request for access in response to unavailability of the second transport resource.

\* \* \* \* \*

UNITED STATES PATENT AND TRADEMARK OFFICE
CERTIFICATE OF CORRECTION

PATENT NO. : 8,649,341 B2 Page 1 of 1
APPLICATION NO. : 13/048226
DATED : February 11, 2014
INVENTOR(S) : Guey et al.

It is certified that error appears in the above-identified patent and that said Letters Patent is hereby corrected as shown below:

In the Specification

In Column 8, Line 16, delete "will" and insert -- it will --, therefor.

In Column 9, Line 65, delete "tunable lasers IL" and insert -- tunable lasers TL --, therefor.

Signed and Sealed this
Sixteenth Day of September, 2014

Michelle K. Lee
*Deputy Director of the United States Patent and Trademark Office*